(12) United States Patent
Kameda

(10) Patent No.: US 10,239,359 B2
(45) Date of Patent: Mar. 26, 2019

(54) PNEUMATIC TIRE

(71) Applicant: The Yokohama Rubber Co., LTD., Minato-ku, Tokyo (JP)

(72) Inventor: Norifumi Kameda, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 458 days.

(21) Appl. No.: 13/791,620

(22) Filed: Mar. 8, 2013

(65) Prior Publication Data

US 2013/0240101 A1 Sep. 19, 2013

(30) Foreign Application Priority Data

Mar. 14, 2012 (JP) ................................. 2012-057520

(51) Int. Cl.
*B60C 11/04* (2006.01)
*B60C 11/11* (2006.01)
(Continued)

(52) U.S. Cl.
CPC .............. *B60C 11/11* (2013.01); *B60C 11/033* (2013.01); *B60C 11/1376* (2013.01); *B60C 11/0306* (2013.01)

(58) Field of Classification Search
CPC ............. B60C 11/1376; B60C 11/1392; B60C 11/1384; B60C 11/033; B60C 2011/0344; B60C 2011/0365; B60C 2011/0376; B60C 2011/0386; B60C 2011/0388; B60C 11/0304; B60C 11/04
See application file for complete search history.

(56) References Cited

U.S. PATENT DOCUMENTS 4,722,378 A * 2/1988 Carolla et al. ............ 152/209.15
4,986,324 A * 1/1991 Suzuki et al. ............ 152/209.18
(Continued)

FOREIGN PATENT DOCUMENTS

JP      57077203 A * 5/1982 ............. B60C 11/00
JP      S63-134313        6/1988
(Continued)

OTHER PUBLICATIONS

Machine Translation: JP 2010012978 A; Takahashi, Junichi; no date.*
Machine Translation: JP 05246215 A; Mitsuyoshi, ISAO; no date.*

*Primary Examiner* — Kendra Ly
(74) *Attorney, Agent, or Firm* — Thorpe North & Western

(57) ABSTRACT

The contact patch of the center land portion partitioned by the center side main grooves protrudes outward in the tire radial direction from the overall standard profile line of the tread portion. The maximum protruding amount is not less than 1.0% and not more than 2.5% of the tire width direction dimension of the center land portion. The contact patch of the intermediate land portion partitioned by the center side main groove and the shoulder side main groove protrudes outward in the tire radial direction from the standard profile line. The maximum protruding amount is not less than 0.7% and not more than 2.0% of the tire width direction dimension of the intermediate land portion. The maximum protruding amount of the center land portion is greater than the maximum protruding amount of the intermediate land portion.

9 Claims, 12 Drawing Sheets

(51) Int. Cl.
*B60C 11/03* (2006.01)
*B60C 11/13* (2006.01)

(56) References Cited

U.S. PATENT DOCUMENTS

| | | | |
|---|---|---|---|
| 5,135,038 A * | 8/1992 | Graas et al. | 152/209.18 |
| 5,240,053 A * | 8/1993 | Baumhofer et al. | 152/209.22 |
| 5,766,383 A * | 6/1998 | Hasegawa | B60C 11/00 |
| | | | 152/209.18 |
| 7,980,280 B2 * | 7/2011 | Ohara | B60C 11/042 |
| | | | 152/209.17 |
| 2005/0241738 A1 * | 11/2005 | Shida | 152/209.15 |
| 2006/0137791 A1 * | 6/2006 | Miyabe et al. | 152/209.18 |
| 2010/0139826 A1 * | 6/2010 | Matsumoto | 152/209.18 |
| 2010/0212792 A1 * | 8/2010 | Mita | 152/209.9 |
| 2011/0061780 A1 * | 3/2011 | Mita | 152/209.8 |
| 2011/0079334 A1 * | 4/2011 | Bott et al. | 152/209.14 |

FOREIGN PATENT DOCUMENTS

| | | | | |
|---|---|---|---|---|
| JP | 03204308 A * | 9/1991 | | B60C 11/00 |
| JP | H5-008611 | 1/1993 | | |
| JP | 05246215 A * | 9/1993 | | |
| JP | 06239111 A * | 8/1994 | | B60C 11/12 |
| JP | 2002-029216 | 1/2002 | | |
| JP | 2002029216 A * | 1/2002 | | B60C 11/00 |
| JP | 2004-122904 | 4/2004 | | |
| JP | 2010012978 A * | 1/2010 | | B60C 11/00 |
| JP | 2012-106608 | 6/2012 | | |

* cited by examiner

| | Conventional Example 1 | Comparative Example 1 | Comparative Example 2 | Working Example 1 | Working Example 2 | Working Example 3 |
|---|---|---|---|---|---|---|
| Center land portion protruding amount (%) | 0 | 0.5 | 1.5 | 1.0 | 2.5 | 1.5 |
| Intermediate land portion protruding amount (%) | 0 | 0.5 | 1.5 | 0.7 | 2.0 | 1.0 |
| Center land portion width [cm] / sub groove Y or N | 30 / N | 30 / N | 30 / N | 30 / N | 30 / N | 30 / N |
| Sub groove position (distance from center of center land portion (%)) | - | - | - | - | - | - |
| Form of center land portion section | - | - | - | - | - | - |
| Center land portion groove area ratio (%) | 3.5 | 3.5 | 3.5 | 3.5 | 3.5 | 3.5 |
| Intermediate land portion groove area ratio (%) Vehicle outer side / vehicle inner side (%) | 4.5/4.8 | 4.5/4.8 | 4.5/4.8 | 4.5/4.8 | 4.5/4.8 | 4.5/4.8 |
| Maximum protrusion position of center land portion (distance from center of center land portion (%)) | - | 12 | 12 | 12 | 12 | 12 |
| Maximum protrusion position of each center land portion section (distance from center of center land portion section (%)) | - | - | - | - | - | - |
| Maximum protrusion position of intermediate land portion (distance from intermediate land portion edge: vehicle outer side / vehicle inner side (%)) | - | 50/50 | 50/50 | 50/50 | 50/50 | 50/50 |
| Steering stability | 100 | 100 | 103 | 108 | 105 | 111 |

FIG. 7

| | Working Example 4 | Working Example 5 | Working Example 6 | Working Example 7 | Working Example 8 | Working Example 9 |
|---|---|---|---|---|---|---|
| Center land portion protruding amount (%) | 1.5 | 1.5 | 1.5 | 1.5 | 1.5 | 1.5 |
| Intermediate land portion protruding amount (%) | 1.0 | 1.0 | 1.0 | 1.0 | 1.0 | 1.0 |
| Center land portion width [cm] / sub groove Y or N | 30/N | 30/N | 30/N | 30/N | 30/N | 30/N |
| Sub groove position (distance from center of center land portion (%)) | - | - | - | - | - | - |
| Form of center land portion section | - | - | - | - | - | - |
| Center land portion groove area ratio (%) | 4 | 10 | 5 | 5 | 5 | 5 |
| Intermediate land portion groove area ratio (%) Vehicle outer side / vehicle inner side (%) | 5/5 | 15/15 | 9/10 | 9/10 | 9/10 | 9/10 |
| Maximum protrusion position of center land portion section (distance from center of center land portion (%)) | 12 | 12 | 10 | 0 | 0 | 0 |
| Maximum protrusion position of each center land portion section (distance from center of center land portion section (%)) | - | - | - | - | - | - |
| Maximum protrusion position of intermediate land portion (distance from intermediate land portion edge: vehicle outer side / vehicle inner side (%)) | 50/50 | 50/50 | 53/53 | 53/53 | 75/75 | 60/60 |
| Steering stability | 114 | 113 | 117 | 120 | 120 | 125 |

FIG. 8

| | Conventional Example 2 | Comparative Example 3 | Comparative Example 4 | Working Example 10 | Working Example 11 | Working Example 12 |
|---|---|---|---|---|---|---|
| Center land portion protruding amount (%) | 0 | 0.5 | 1.5 | 1.0 | 2.5 | 1.5 |
| Intermediate land portion protruding amount (%) | 0 | 0.5 | 1.5 | 0.7 | 2.0 | 1.0 |
| Center land portion width (cm) / sub groove Y or N | 40 / Y | 40 / Y | 40 / Y | 40 / Y | 40 / Y | 40 / Y |
| Sub groove position (distance from center of center land portion (%)) | 20 | 20 | 20 | 20 | 20 | 20 |
| Form of center land portion section | - | FIG. 5 | FIG. 5 | FIG. 5 | FIG. 5 | FIG. 5 |
| Center land portion groove area ratio (%) | 3.5 | 3.5 | 3.5 | 3.5 | 3.5 | 3.5 |
| Intermediate land portion groove area ratio (%) Vehicle outer side / vehicle inner side (%) | 4.5/4.8 | 4.5/4.8 | 4.5/4.8 | 4.5/4.8 | 4.5/4.8 | 4.5/4.8 |
| Maximum protrusion position of center land portion (distance from center of center land portion (%)) | - | 12 | 12 | 12 | 12 | 12 |
| Maximum protrusion position of each center land portion section (distance from center of center land portion section (%)) | - | - | - | - | - | - |
| Maximum protrusion position of intermediate land portion (distance from intermediate land portion edge: vehicle outer side / vehicle inner side (%)) | - | 50/50 | 50/50 | 50/50 | 50/50 | 50/50 |
| Steering stability | 100 | 100 | 103 | 108 | 105 | 111 |

FIG. 9

| | Working Example 13 | Working Example 14 | Working Example 15 | Working Example 16 | Working Example 17 | Working Example 18 |
|---|---|---|---|---|---|---|
| Center land portion protruding amount (%) | 1.5 | 1.5 | 1.5 | 1.5 | 1.5 | 1.5 |
| Intermediate land portion protruding amount (%) | 1.0 | 1.0 | 1.0 | 1.0 | 1.0 | 1.0 |
| Center land portion width (cm) / sub groove Y or N | 50 / Y | 40 / Y | 50 / Y | 50 / Y | 50 / Y | 50 / Y |
| Sub groove position (distance from center of center land portion (%)) | 20 | 20 | 20 | 20 | 20 | 20 |
| Form of center land portion section | FIG. 5 | FIG. 5 | FIG. 5 | FIG. 5 | FIG. 5 | FIG. 5 |
| Center land portion groove area ratio (%) | 4 | 10 | 5 | 5 | 5 | 5 |
| Intermediate land portion groove area ratio (%) Vehicle outer side / vehicle inner side (%) | 5/5 | 15/15 | 9/10 | 9/10 | 9/10 | 9/10 |
| Maximum protrusion position of center land portion (distance from center of center land portion (%)) | 12 | 12 | 10 | 0 | 0 | 0 |
| Maximum protrusion position of each center land portion section (distance from center of center land portion section (%)) | - | - | - | - | - | - |
| Maximum protrusion position of intermediate land portion (distance from intermediate land portion edge: vehicle outer side / vehicle inner side (%)) | 50/50 | 50/50 | 53/53 | 53/53 | 75/75 | 60/60 |
| Steering stability | 114 | 113 | 117 | 120 | 120 | 125 |

FIG. 10

|  | Conventional Example 2 | Comparative Example 5 | Comparative Example 6 | Working Example 19 | Working Example 20 | Working Example 21 |
|---|---|---|---|---|---|---|
| Center land portion protruding amount (%) | 0 | 0.5 | 1.5 | 1.0 | 2.5 | 1.5 |
| Intermediate land portion protruding amount (%) | 0 | 0.5 | 1.5 | 0.7 | 2.0 | 1.0 |
| Center land portion width [cm] / sub groove Y or N | 40 / Y | 40 / Y | 40 / Y | 40 / Y | 40 / Y | 40 / Y |
| Sub groove position (distance from center of center land portion (%)) | 20 | 20 | 20 | 20 | 20 | 20 |
| Form of center land portion section | - | FIG. 6 | FIG. 6 | FIG. 6 | FIG. 6 | FIG. 6 |
| Center land portion groove area ratio (%) | 3.5 | 3.5 | 3.5 | 3.5 | 3.5 | 3.5 |
| Intermediate land portion groove area ratio (%) Vehicle outer side / vehicle inner side (%) | 4.5/4.8 | 4.5/4.8 | 4.5/4.8 | 4.5/4.8 | 4.5/4.8 | 4.5/4.8 |
| Maximum protrusion position of center land portion (distance from center of center land portion (%)) | - | - | - | - | - | - |
| Maximum protrusion position of each center land portion section (distance from center of center land portion section (%)) | - | 12 | 12 | 12 | 12 | 12 |
| Maximum protrusion position of intermediate land portion (distance from intermediate land portion edge: vehicle outer side / vehicle inner side (%)) | - | 50/50 | 50/50 | 50/50 | 50/50 | 50/50 |
| Steering stability | 100 | 100 | 103 | 108 | 105 | 111 |

FIG. 11

| | Working Example 22 | Working Example 23 | Working Example 24 | Working Example 25 | Working Example 26 | Working Example 27 |
|---|---|---|---|---|---|---|
| Center land portion protruding amount (%) | 1.5 | 1.5 | 1.5 | 1.5 | 1.5 | 1.5 |
| Intermediate land portion protruding amount (%) | 1.0 | 1.0 | 1.0 | 1.0 | 1.0 | 1.0 |
| Center land portion width [cm] / sub groove Y or N | 50 / Y | 40 / Y | 50 / Y | 50 / Y | 50 / Y | 50 / Y |
| Sub groove position (distance from center of center land portion (%)) | 20 | 20 | 20 | 20 | 20 | 20 |
| Form of center land portion section | FIG. 6 | FIG. 6 | FIG. 6 | FIG. 6 | FIG. 6 | FIG. 6 |
| Center land portion groove area ratio (%) | 4 | 10 | 5 | 5 | 5 | 5 |
| Intermediate land portion groove area ratio (%) Vehicle outer side / vehicle inner side (%) | 5/5 | 15/15 | 9/10 | 9/10 | 9/10 | 9/10 |
| Maximum protrusion position of center land portion (distance from center of center land portion (%)) | - | - | - | - | - | - |
| Maximum protrusion position of each center land portion section (distance from center of center land portion section (%)) | 12 | 12 | 10 | 0 | 0 | 0 |
| Maximum protrusion position of intermediate land portion (distance from intermediate land portion edge: vehicle outer side / vehicle inner side (%)) | 50/50 | 50/50 | 53/53 | 53/53 | 75/75 | 60/60 |
| Steering stability | 114 | 113 | 117 | 120 | 120 | 125 |

FIG. 12

PNEUMATIC TIRE

PRIORITY CLAIM

Priority is claimed to Japan Patent Application Serial No. 2012-057520 filed on Mar. 14, 2012.

BACKGROUND

Technical Field

The present technology relates to a pneumatic tire, and more particularly relates to a pneumatic tire with improved steering stability.

Related Art

It is considered that in order to improve the steering stability on dry road surfaces, the land portion width of a tread portion should be set wide, with the aim of ensuring the tread rigidity. However, in this case, the footprint length in a tire circumferential direction of a land portion of a ground contact region in the center in a width direction of the land portion is shortened, so the edges collapse inwards and the footprint properties worsen. It is considered that this has an adverse effect on the steering stability on dry road surfaces.

Conventionally, for example, in the pneumatic tire disclosed in Japanese Unexamined Patent Application Publication No. 2002-29216A, to ensure rectilinear stability, in the tread portion, a land portion is partitioned by a main groove extending in a tire circumferential direction. The ground contact surface of the land portion is formed like a curve projecting outward in a tire radial direction. The top part of the ground contact surface that is closest to the tread ground contact surface profile line in the tire width direction is deflected toward a first side edge side of the land portion with respect to the center in the width direction of the land portion within ranges 0.1 to 0.4 times the width of the land portion.

By curving the land portion so that it projects outward in the tire radial direction, as in the pneumatic tire disclosed in Japanese Unexamined Patent Application Publication No. 2002-29216A as described above, the footprint properties of the land portion tend to be improved. However, to improve the footprint properties of the land portions in the whole tire width direction of the tread portion, it is necessary to optimize the contact patch taking into consideration the position of the land portion in the tire width direction.

With the foregoing in view, it is an object of the present technology to provide a pneumatic tire that is capable of improving the footprint properties in the whole tire width direction of the tread portion, and improving the steering stability.

SUMMARY

To resolve the above problem and achieve the object, a pneumatic tire according to the present technology includes: two main grooves extending in a tire circumferential direction on either side of a tire equator line in a tire width direction, five land portions extending in the tire circumferential direction partitioned by the main grooves, on a tread surface of a tread portion, wherein the two center side main grooves located close to the tire equator line are disposed such that centers in the tire width direction are located at positions offset from the tire equator line outward in the tire width direction not less than 10% and not more than 18% of a ground contact width; the two shoulder side main grooves located outward in the tire width direction are disposed such that centers in the tire width direction are located at positions offset from the tire equator line outward in the tire width direction not less than 25% and not more than 35% of the ground contact width; a contact patch of a center land portion partitioned by the center side main grooves protrudes outward in a tire radial direction from an overall standard profile line of the whole tread portion, and a maximum protruding amount thereof is not less than 1.0% and not more than 2.5% of the tire width direction dimension of the center land portion; a contact patch of an intermediate land portion partitioned by the center side main groove and the shoulder side main groove protrudes outward in the tire radial direction from the standard profile line, and a maximum protruding amount thereof is not less than 0.7% and not more than 2.0% of the tire width direction dimension of the intermediate land portion; and the maximum protruding amount of the center land portion is greater than the maximum protruding amount of the intermediate land portion.

If the maximum protruding amount of the center land portion and the intermediate land portion is less than the above range or greater than the above range, it will be difficult to improve the ground contact shape. In other words, if the maximum protruding amount of the center land portion and the intermediate land portion is less than the above range, the footprint length in the tire circumferential direction of the land portions in the ground contact region will be shortened, and the footprint properties will be worsened. On the other hand, if the maximum protruding amount of the center land portion and the intermediate land portion is greater than the above range, the ground contact properties of the edges in the tire width direction of the land portions will be worsened. According to the pneumatic tire of the present technology, by setting the maximum protruding amount of the center land portion and the intermediate land portion to the appropriate range, the footprint properties in the tire circumferential direction and the tire width direction are improved, so it is possible to improve the steering stability on dry road surfaces.

Also, in the pneumatic tire according to the present technology, the tire width direction dimension of the center land portion is not less than 40 mm; a sub groove is provided extending in the tire circumferential direction; the sub groove is disposed such that a center in the tire width direction is within 20% of the tire width direction dimension of the center land portion from the position of the center in the tire width direction of the center land portion toward both sides in the tire width direction; the center land portion is bisected in the tire width direction by the sub groove so as to partition and form two center land portion sections; and maximum protruding amounts of contact patches of the center land portion sections are each not less than 1.0% and not more than 2.5% of the respective tire width direction dimension of the center land portion section.

According to this pneumatic tire, when the tire width direction dimension of the center land portion is not less than 40 mm, the sub groove is added which bisects the center land portion so as to form two center land portion sections. By setting the maximum protruding amounts of the center land portion sections to the above ranges, the footprint properties in the tire circumferential direction and the tire width direction of the center land portion are improved. Therefore, it is possible to improve the steering stability on dry road surfaces.

Also, in the pneumatic tire according to the present technology, a groove area ratio of the grooves provided in the contact patch of the center land portion is not less than 4% and not more than 10%, and a groove area ratio of the grooves provided in the contact patch of the intermediate land portion is not less than 5% and not more than 15%.

By making the groove area ratio of the center land portion not less than 4% and the groove area ratio of the intermediate land portion not less than 5%, the rubber volume is reduced, the shrinkage of the tread rubber during vulcanization is excellent, and the footprint properties are further improved. On the other hand, by making the groove area ratio of the center land portion not more than 10% and the groove area ratio of the intermediate land portion not more than 15%, the reduction in rigidity of the land portion is suppressed, and the steering stability on dry road surfaces is further improved. Therefore, according to the pneumatic tire of the present technology, it is possible to improve the footprint properties, and obtain a significant effect of improvement in steering stability on dry road surfaces.

In the pneumatic tire according to the present technology, a maximum protrusion position of the contact patch of the center land portion is disposed within 10% of the tire width direction dimension of the center land portion toward both sides in the tire width direction from the center in the tire width direction of the center land portion; and a maximum protrusion position of the contact patch of the intermediate land portion is disposed not less than 53% and not more than 75% of the tire width direction dimension of the intermediate land portion from an edge of the intermediate land portion on an inner side in the tire width direction outward in the tire width direction.

In the center land portion, the footprint length in the tire circumferential direction tends to be shortest near the center in the tire width direction, and in the intermediate land portion, the footprint length in the tire circumferential direction tends to be shortest outward in the tire width direction from the center in the tire width direction. Therefore, according to the pneumatic tire of the present technology, by prescribing the above ranges for the maximum protrusion position in the land portions, the footprint properties are improved, and it is possible to obtain a significant effect of improvement in the steering stability on dry road surfaces.

Also, in the pneumatic tire according to the present technology, the tire width direction dimension of the center land portion is not less than 40 mm; a sub groove is provided extending in the tire circumferential direction; the sub groove is disposed such that a center in the tire width direction is within 20% of the tire width direction dimension of the center land portion from the position of the center in the tire width direction of the center land portion toward both sides in the tire width direction; the center land portion is bisected in the tire width direction by the sub groove so as to partition and form two center land portion sections; the maximum protruding amounts of the contact patches of the center land portion sections are each not less than 1.0% and not more than 2.5% of the respective tire width direction dimension of the center land portion section; a maximum protrusion position of the contact patch of each of the center land portion sections is disposed within 10% of the tire width direction dimension of the respective center land portion section toward both sides in the tire width direction from the center in the tire width direction of the center land portion section; and the maximum protrusion position of the contact patch of the intermediate land portion is disposed not less than 53% and not more than 75% of the tire width direction dimension of the intermediate land portion from an edge of the intermediate land portion on an inner side in the tire width direction outward in the tire width direction.

In the center land portion sections, the footprint length in the tire circumferential direction tends to be shortest near the center in the tire width direction, and in the intermediate land portion, the footprint length in the tire circumferential direction tends to be shortest outward in the tire width direction from the center in the tire width direction. Therefore, according to the pneumatic tire of the present technology, by prescribing the above ranges for the maximum protrusion position in the land portions, the footprint properties are improved and it is possible to obtain a significant effect of improvement in the steering stability on dry road surfaces.

The pneumatic tire according to the present technology is capable of improving the footprint properties in the whole tire width direction of the tread portion, and improving the steering stability.

BRIEF DESCRIPTION OF THE DRAWINGS

FIGS. 7-12 include a table showing results of performance testing of pneumatic tires according to examples of the present technology.

DETAILED DESCRIPTION

An embodiment of the present technology is described below in detail based on the drawings. However, the present technology is not limited to these embodiments. The constituents of the embodiment include constituents that can be easily replaced by those skilled in the art and constituents substantially same as the constituents of the embodiment. Furthermore, the multiple modified examples described in the embodiment can be combined as desired within the scope apparent to a person skilled in the art.

First Embodiment

Figure 1:
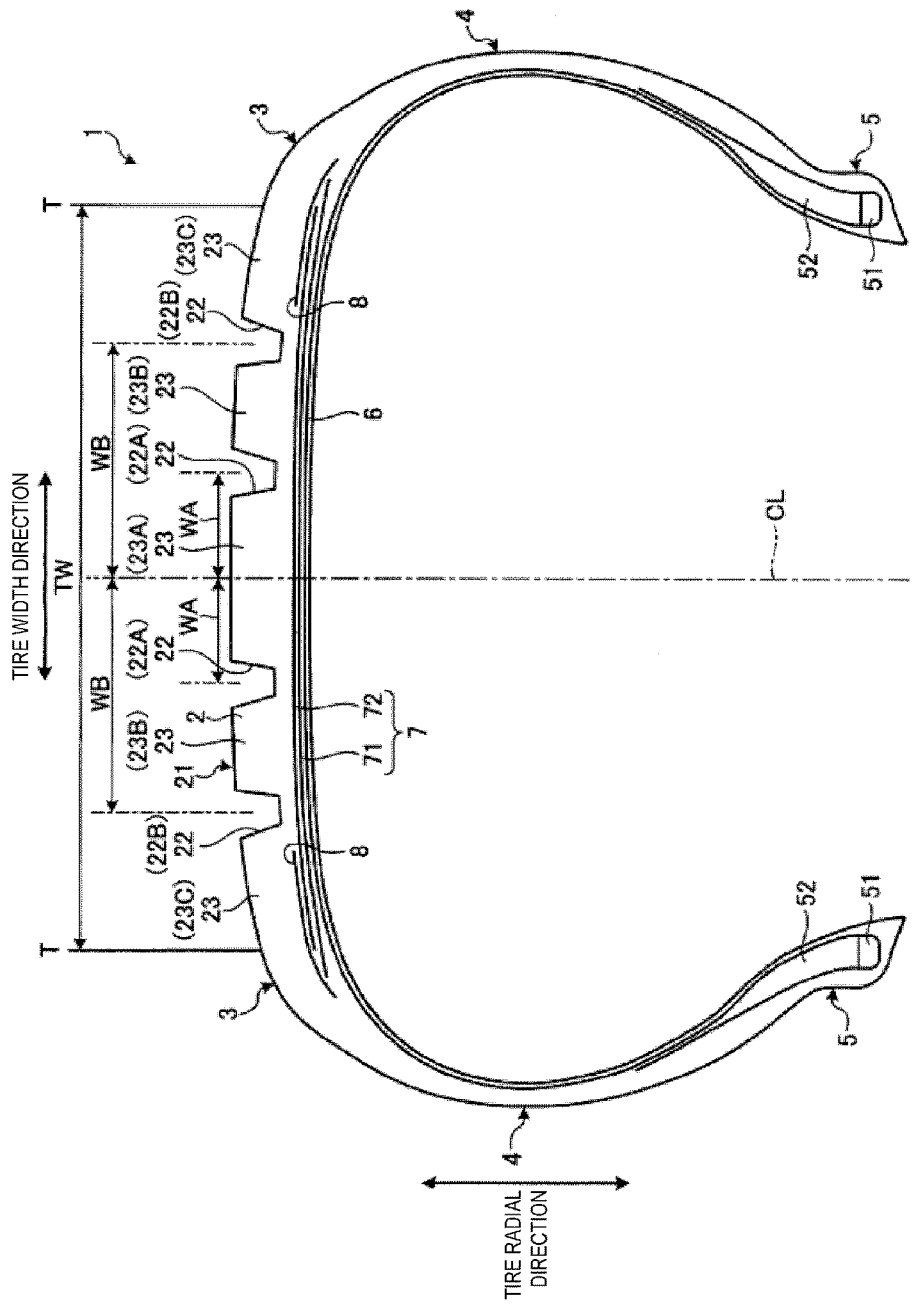
FIG. 1 is a meridian cross-sectional view of a pneumatic tire according to an embodiment of the present technology.
Figure 2:
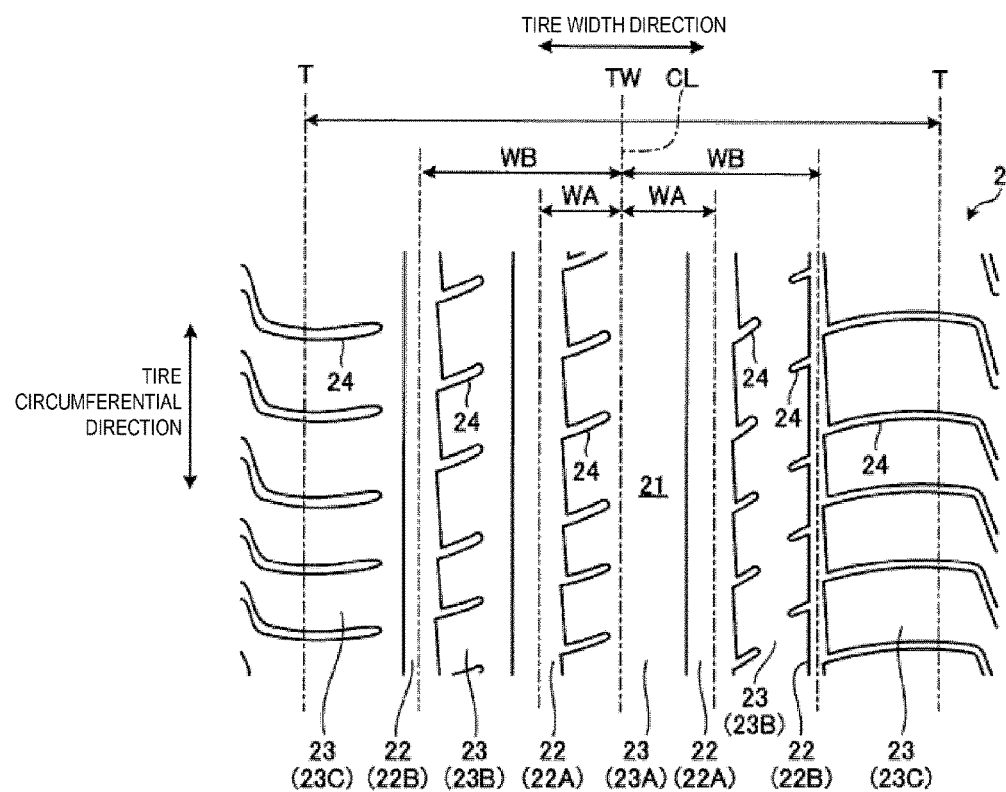
FIG. 2 is a plan view of a pneumatic tire according to a first embodiment of the present technology.

FIG. 1 is a meridian cross-sectional view of a pneumatic tire 1 according to this embodiment of the present technology. FIG. 2 is a plan view of the pneumatic tire according to this embodiment. In the following description, "tire radial direction" refers to a direction orthogonal to the rotational axis (not illustrated) of the pneumatic tire 1; "inner side in the tire radial direction" refers to the side facing the rotational axis in the tire radial direction; and "outer side in the tire radial direction" refers to the side distanced from the rotational axis in the tire radial direction. "Tire circumferential direction" refers to a circumferential direction with the rotational axis as a center axis. Additionally, "tire width direction" refers to the direction parallel to the rotational axis; "inner side in the tire width direction" refers to the side facing a tire equatorial plane CL (tire equator line) in the tire width direction; and "outer side in the tire width direction" refers to the side distanced from the tire equatorial plane CL in the tire width direction. "Tire equatorial plane CL" refers to a plane that is orthogonal to the rotational axis of the pneumatic tire 1 and that passes through a center of a tire width of the pneumatic tire 1. The tire width is a width in the tire width direction between constituents located outward in the tire width direction, in other words, the distance between the constituents that are most distant in the tire width direction from the tire equatorial plane CL. "Tire equator line" refers to a line along the tire circumferential direction of the pneumatic tire 1 that lies on the tire equatorial plane CL. In this embodiment, "tire equator line" is given the same "CL" reference symbol as that used for the tire equatorial plane.

As illustrated in FIG. 1, the pneumatic tire 1 of this embodiment includes a tread portion 2, shoulder portions 3 on both sides of the tread portion 2, and a side wall portion 4 and a bead portion 5 continuing sequentially from each of the shoulder portions 3. Additionally, the pneumatic tire 1 includes a carcass layer 6, a belt layer 7, and a belt reinforcing layer 8.

The tread portion 2 is formed from a rubber material (tread rubber), is exposed on the outermost side in the tire radial direction of the pneumatic tire 1, and a surface thereof constitutes a profile of the pneumatic tire 1. A tread surface 21 is formed on the peripheral top surface of the tread portion 2, in other words, on the road contact surface that contacts the road surface when traveling. The tread surface 21 extends along the tire circumferential direction, and four main grooves 22 that are straight main grooves and parallel (includes ±5°) with the tire equator line CL are provided in the tread surface 21. Here, main groove 22 refers to a groove extending in the tire circumferential direction having a groove width of not less than 3.0 mm. Moreover, five rib-like land portions 23 extending along the tire circumferential direction and parallel with the tire equator line CL are formed in the tread surface 21 by the plurality of main grooves 22.

Also, as illustrated in FIG. 2, lug grooves 24 that intersect with the main grooves 22 are provided in the tread surface 21 in each of the land portions 23. Here, lug groove 24 refers to a groove having a groove width of exceeding 1.6 mm and extending in a direction that intersects with the tire circumferential direction. The lug grooves 24 illustrated in FIG. 2 are provided with a terminating edge within the land portions 23. Although not explicitly illustrated in the drawings, the lug grooves 24 may be provided connecting both edges of the main grooves 22, so that the land portions 23 are divided into a plurality in the tire circumferential direction.

The shoulder portions 3 are locations on both outer sides in the tire width direction of the tread portion 2. Additionally, the side wall portions 4 are exposed at an outermost side in the tire width direction of the pneumatic tire 1. The bead portions 5 include a bead core 51 and a bead filler 52. The bead core 51 is formed by winding a steel wire (bead wire) in a ring-like manner. The bead filler 52 is a rubber material that is disposed in space formed by ends of the carcass layer 6 in the tire width direction being folded up at a position of the bead core 51.

The ends of the carcass layer 6 in the tire width direction are folded over the pair of bead cores 51 from the inner side in the tire width direction outward in the tire width direction, and the carcass layer 6 is stretched in a toroidal shape in the tire circumferential direction to form the framework of the tire. The carcass layer 6 is constituted by a plurality of carcass cords (not illustrated) juxtaposed in the tire circumferential direction along the tire meridian direction having a given angle with respect to the tire circumferential direction, and covered by a coating rubber. The carcass cords are formed from organic fibers (e.g. polyester, rayon, nylon, or the like). As illustrated in FIG. 1, the carcass layer 6 is provided having two layers, but at least one layer is provided.

The belt layer 7 has a multi-layer structure where at least two layers (belts 71 and 72) are stacked; is disposed on an outer side in the tire radial direction that is the periphery of the carcass layer 6, in the tread portion 2; and covers the carcass layer 6 in the tire circumferential direction. The belts 71 and 72 are constituted by a plurality of cords (not illustrated) juxtaposed at a predetermined angle with respect to the tire circumferential direction (e.g. from 20 degrees to 30 degrees), and covered by a coating rubber. The cords are formed from steel or organic fibers (e.g. polyester, rayon, nylon, or the like). Moreover, the overlapping belts 71 and 72 are disposed so that the cords thereof mutually cross.

The belt reinforcing layer 8 is disposed on the outer side in the tire radial direction that is the periphery of the belt layer 7, and covers the belt layer 7 in the tire circumferential direction. The belt reinforcing layer 8 is constituted by a plurality of cords (not illustrated), juxtaposed in the tire width direction and parallel (+5 degrees) to the tire circumferential direction, and covered by a coating rubber. The cords are formed from steel or organic fibers (e.g. polyester, rayon, nylon, or the like). The belt reinforcing layer 8 illustrated in FIG. 1 is disposed so as to cover end portions in the tire width direction of the belt layer 7. The configuration of the belt reinforcing layer 8 is not limited to that described above. While not explicitly illustrated in the drawings, a configuration may be used where the belt reinforcing layer 8 is disposed so as to cover an entirety of the belt layer 7. Alternatively, for example, a configuration may be used where the belt reinforcing layer 8 has two reinforcing layers, where the belt reinforcing layer 8 is formed so that the reinforcing layer on the inner side in the tire radial direction is longer in the tire width direction than the belt layer 7 and disposed so as to cover the entirety of the belt layer 7, and the reinforcing layer on the outer side in the tire radial direction is disposed so as only to cover the end portions in the tire width direction of the belt layer 7. Alternatively, for example, a configuration may be used where the belt reinforcing layer 8 has two reinforcing layers, where each of the reinforcing layers is disposed so as only to cover the end portions in the tire width direction of the belt layer 7. In other words, the belt reinforcing layer 8 overlaps with at least the end portions in the tire width direction of the belt layer 7. Additionally, the belt reinforcing layer 8 is provided by winding band-like (e.g. with a width of 10 mm) strip material in the tire circumferential direction.

Figure 3:
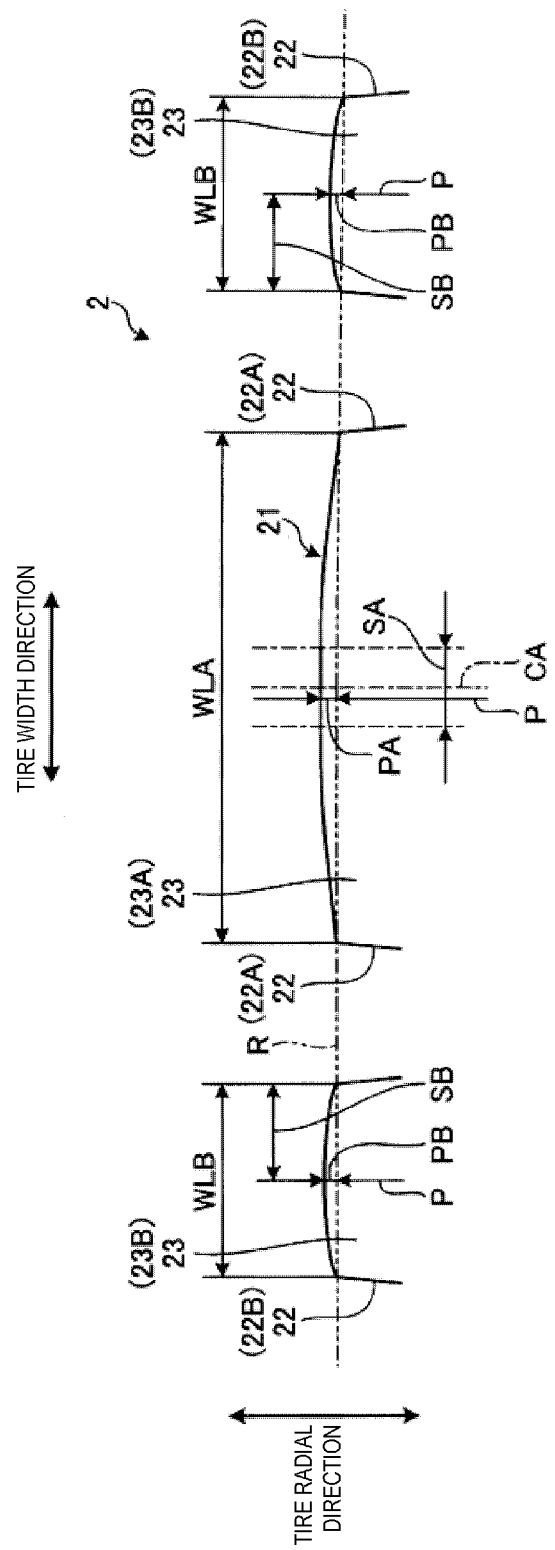
FIG. 3 is a partial enlarged meridian cross-sectional view of the tread portion of the pneumatic tire according to the first embodiment of the present technology.

FIG. 3 is a partial enlarged meridian cross-sectional view of the tread portion of the pneumatic tire according to this embodiment.

In the pneumatic tire 1 as described above, as illustrated in FIG. 1 and FIG. 2, the two main grooves 22 located near the tire equator line CL are center side main grooves 22A, and the two main grooves 22 located outward in the tire width direction are shoulder side main grooves 22B. The center side main grooves 22A are disposed such that the centers of their openings in the tire width direction are located at positions offset from the tire equator line CL on the outer side in the tire width direction by the distance WA not less than 10% and not more than 18% of the ground contact width TW. Also, the shoulder side main grooves 22B are disposed such that the centers of their openings in the tire width direction are located at positions offset from the tire equator line CL on the outer side in the tire width direction by the distance WB not less than 25% and not more than 35% of the ground contact width TW.

Here, the "ground contact edge T" refers to both outermost edges in the tire width direction of a region in which the tread surface 21 of the tread portion 2 of the pneumatic tire 1 contacts the road surface when the pneumatic tire 1 is assembled on a regular rim and filled with regular inner pressure and 80% of the regular load is applied, and the ground contact edge T continues in the tire circumferential direction. Also, the ground contact width TW is the spacing in the tire width direction between the two ground contact edges T. Here, "Regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular inner pressure" refers to "maximum air pressure" stipulated by JATMA, a maximum value in "tire load limits at various cold inflation pressures" defined by IRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO.

Also, as illustrated in FIGS. 1 to 3, the land portion 23 partitioned by the center side main grooves 22A is a center land portion 23A, the land portion 23 partitioned by the center side main groove 22A and the shoulder side main groove 22B is an intermediate land portion 23B, and the land portion 23 that includes the ground contact edge T and that is partitioned by the shoulder side main groove 22B on the outer side in the tire width direction is a shoulder land portion 23C.

The contact patches of the center land portion 23A and the intermediate land portion 23B are formed protruding outward in the tire radial direction from the overall standard profile line R of the tread portion 2. The standard profile line R is formed from a continuous arc that passes through the opening edges of each main groove 22 (the edges of each land portion 23) along the tire width direction of the tread surface 21. In the center land portion 23A, the maximum protruding amount PA from the standard profile line R is not less than 1.0% and not more than 2.5% of the tire width direction dimension WLA (the dimension between the edges of the center land portion 23A) of the center land portion 23A itself. Also, in the intermediate land portions 23B, the maximum protruding amount PB from the standard profile line R is not less than 0.7% and not more than 2.0% of the tire width direction dimension WLB (the dimension between the edges of the intermediate land portion 23B) of the intermediate land portion 23B itself. In addition, the maximum protruding amount PA of the center land portion 23A is greater than the maximum protruding amount PB of the intermediate land portion 23B.

As described above, the pneumatic tire 1 according to this embodiment includes: two center side main grooves 22A located close to the tire equator line CL that are disposed such that centers in the tire width direction are located at positions offset from the tire equator line CL outward in the tire width direction not less than 10% and not more than 18% of the ground contact width TW; and two shoulder side main grooves 22B located outward in the tire width direction that are disposed such that centers in the tire width direction are located at positions offset from the tire equator line CL outward in the tire width direction not less than 25% and not more than 35% of the ground contact width TW. The contact patch of the center land portion 23A partitioned by each center side main groove 22A protrudes outward in the tire radial direction from the overall standard profile line R of the tread portion 2. The maximum protruding amount PA of the center land portion 23A is not less than 1.0% and not more than 2.5% of the tire width direction dimension WLA of the center land portion 23A. The contact patch of the intermediate land portion 23B partitioned by the center side main groove 22A and the shoulder side main groove 22B protrudes outward in the tire radial direction from the standard profile line R. The maximum protruding amount PB of the intermediate land portion 23B is not less than 0.7% and not more than 2.0% of the tire width direction dimension WLB of the intermediate land portion 23B. The maximum protruding amount PA of the center land portion 23A is greater than the maximum protruding amount PB of the intermediate land portion 23B.

If the maximum protruding amount PA, PB of the center land portion 23A and the intermediate land portion 23B is less than the above range or greater than the above range, it will be difficult to improve the ground contact shape. In other words, if the maximum protruding amount PA, PB of the center land portion 23A and the intermediate land portion 23B is less than the above range, the footprint length in the tire circumferential direction of the land portions 23A, 23B in the ground contact region will be shortened, and the footprint properties will be worsened. On the other hand, if the maximum protruding amount PA, PB of the center land portion 23A and the intermediate land portion 23B is greater than the above range, the ground contact properties of the edges in the tire width direction of the land portions 23A, 23B will be worsened. According to the pneumatic tire 1 of this embodiment, by setting the maximum protruding amount PA, PB of the center land portion 23A and the intermediate land portion 23B to the appropriate range, the footprint properties in the tire circumferential direction and the tire width direction are improved, so it is possible to improve the steering stability on dry road surfaces.

Also, in the pneumatic tire 1 according to this embodiment, preferably, the groove area ratio of the grooves provided in the contact patch of the center land portion 23A is not less than 4% and not more than 10%, and the groove area ratio of the grooves provided in the contact patch of the intermediate land portion 23B is not less than 5% and not more than 15%.

Here, "groove area ratio" is defined as groove area/(groove area+ground contact area). "Groove area" refers to the opening area of the grooves in the contact patch. Also, "groove" refers to lug grooves 24 in this embodiment. "Ground contact area" refers to the contact area between the tire and the contact patch. Note that the groove area and the ground contact area are measured at a contact surface between a tire and a flat plate in a configuration in which the tire is assembled on a standard rim, filled with a prescribed internal pressure, placed perpendicularly with respect to the flat plate in a static state, and loaded with a load corresponding to a prescribed load.

By making the groove area ratio of the center land portion 23A not less than 4% and the groove area ratio of the intermediate land portion 23B not less than 5%, the rubber volume is reduced, the shrinkage of the tread rubber during vulcanization is excellent, and the footprint properties are further improved. On the other hand, by making the groove area ratio of the center land portion 23A not more than 10% and the groove area ratio of the intermediate land portion 23B not more than 15%, the reduction in rigidity of the land portion 23 is suppressed, and the steering stability on dry road surfaces is further improved. Therefore, according to the pneumatic tire 1, it is possible to improve the footprint properties, and obtain a significant effect of improvement in steering stability on dry road surfaces.

When mounted on a vehicle (not illustrated), in the case of the pneumatic tire 1 for which the orientation with respect to the inside and the outside of the vehicle in the tire width direction is designated, designation of the orientation is indicated by, for example, a mark provided on the side wall portion 4 (not explicitly illustrated on the drawings). Hereinafter, a side facing the inner side of the vehicle when mounted on the vehicle is referred to as a "vehicle inner side" and a side facing the outer side of the vehicle is referred to as a "vehicle outer side". Note that the designations of the vehicle inner side and the vehicle outer side are not limited to cases when mounted on the vehicle. For example, in cases when assembled on a rim, orientation of the rim with respect to the inner side and the outer side of the vehicle in the tire width direction is set. Therefore, in cases when the pneumatic tire 1 is assembled on a rim, the orientation with respect to the inner side (vehicle inner side) and the outer side (vehicle outer side) of the vehicle in the tire width direction is designated.

In this way, in the pneumatic tires 1 in which the orientation with respect to the inside and the outside of the vehicle is designated, preferably, the groove area ratio of the intermediate land portion 23B on the vehicle outer side is set to be less than the groove area ratio of the intermediate land portion 23B on the vehicle inner side, so the rigidity is increased on the vehicle outer side, and the steering stability when cornering is improved.

Also, as illustrated in FIG. 3, in the pneumatic tire 1 according to this embodiment, preferably, the maximum protrusion position P of the contact patch in the center land portion 23A is disposed in a range SA within 10% of the tire width direction dimension WLA of the center land portion 23A toward both sides in the tire width direction from the center CA in the tire width direction of the center land portion 23A. Also, preferably, the maximum protrusion position P of the contact patch in the intermediate land portion 23B is disposed in a range SB not less than 53% and not more than 75% of the tire width direction dimension WLB of the intermediate land portion 23B from the edge of the intermediate land portion 23B on the inner side in the tire width direction outward in the tire width direction.

In the center land portion 23A, the footprint length in the tire circumferential direction tends to be shortest near the center CA in the tire width direction, and in the intermediate land portion 23B, the footprint length in the tire circumferential direction tends to be shortest outward in the tire width direction from the center in the tire width direction. Therefore, by prescribing the above ranges for the maximum protrusion position P in the land portions 23A, 23B, the footprint properties are improved, and it is possible to obtain a significant effect of improvement in the steering stability on dry road surfaces. More preferably, the maximum protrusion position P of the contact patch in the center land portion 23A is disposed at the center CA in the tire width direction of the center land portion 23A, in other words, the center of the tire width direction dimension WLA of the center land portion 23A. This is a position 0% of the tire width direction dimension WLA toward both sides in the tire width direction from the center CA in the tire width direction of the center land portion 23A. In this way, the footprint properties are improved, and it is possible to obtain a significant effect of improving the steering stability on dry road surfaces.

Second Embodiment

Figure 4:
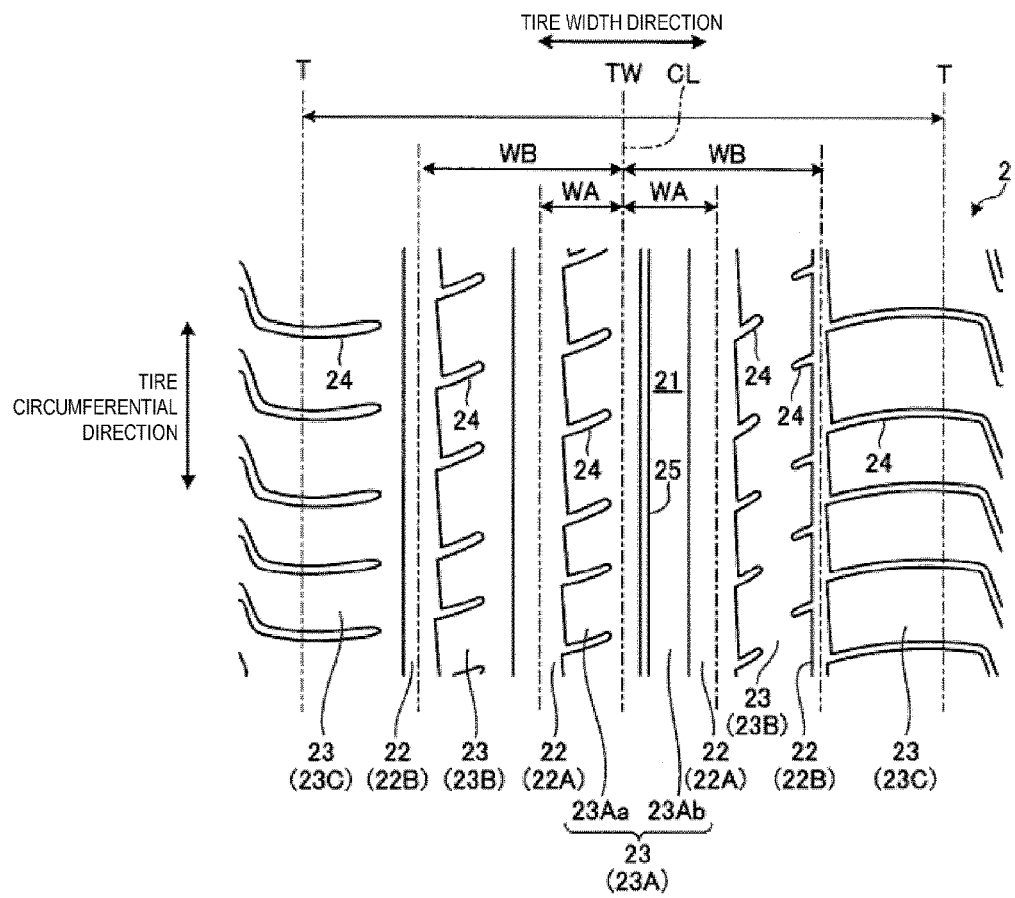
FIG. 4 is a plan view of a pneumatic tire according to a second embodiment of the present technology.
Figure 5:
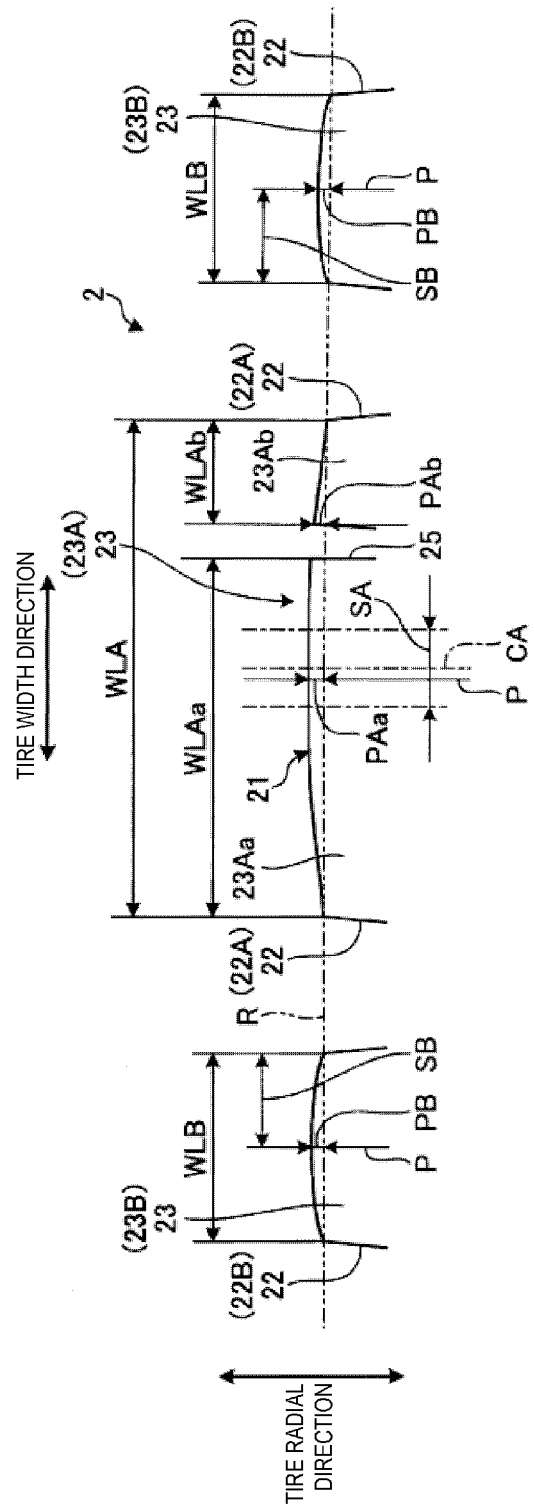
FIG. 5 is a partial enlarged meridian cross-sectional view of the tread portion of the pneumatic tire according to the second embodiment of the present technology.
Figure 6:
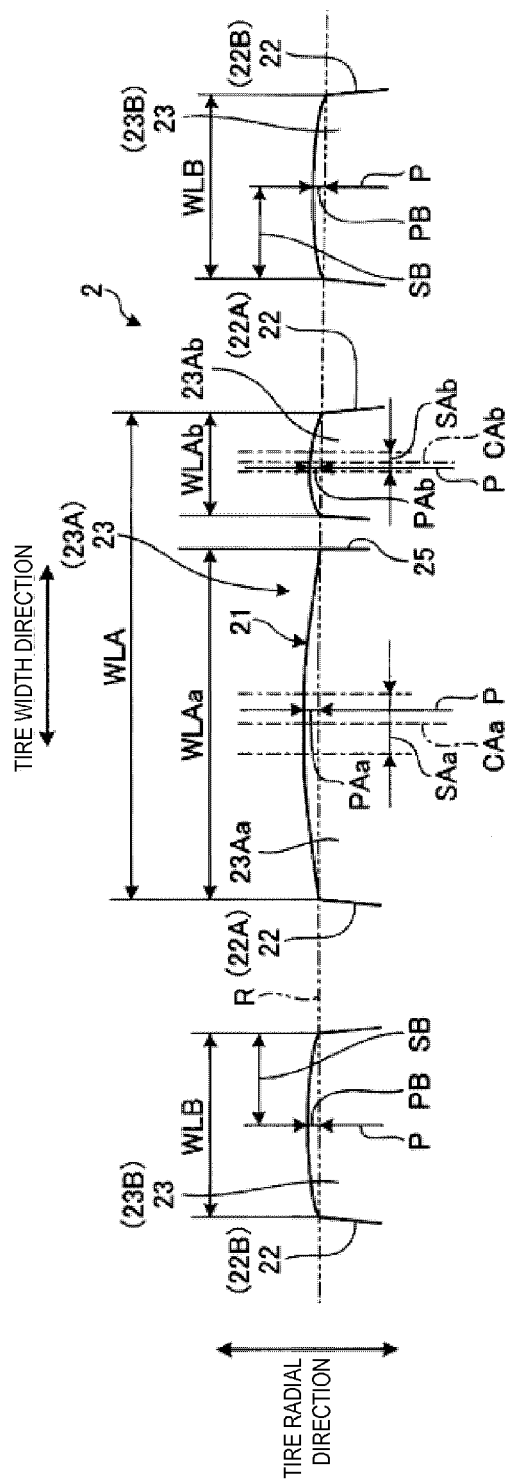
FIG. 6 is a partial enlarged meridian cross-sectional view of the tread portion of the pneumatic tire according to the second embodiment of the present technology.

FIG. 4 is a plan view of the pneumatic tire according to this embodiment, and FIGS. 5 and 6 are partial enlarged meridian cross-sectional views of the tread portion of the pneumatic tire according to this embodiment. In the pneumatic tire 1 according to this embodiment, the configuration of the center land portion 23A is different from that of the pneumatic tire 1 according to the first embodiment. Therefore, constituents identical to those of the first embodiment are assigned identical reference numerals, and detailed descriptions thereof are omitted.

As illustrated in FIGS. 4 and 5, in the pneumatic tire 1 according to this embodiment, the tire width direction dimension WLA of the land portion 23A is not less than 40 mm, and a sub groove 25 extending in the tire circumferential direction is provided in the center land portion 23A. Here, sub groove 25 refers to a groove extending in the tire circumferential direction having a groove width of less than 3.0 mm, which is narrower than the groove width of the main grooves 22, and having a groove depth that is shallower than that of the main grooves 22.

The sub groove 25 is disposed with the center of the opening in the tire width direction within 20% of the tire width direction dimension WLA of the center land portion 23A from the center position in the tire width direction toward both sides in the tire width direction of the center land portion 23A. The center land portion 23A is bisected by the sub groove 25, partitioning and forming center land portion sections 23Aa, 23Ab in the tire width direction.

The contact patches of the center land portion sections 23Aa, 23Ab are formed protruding outward in the tire radial direction with respect to the standard profile line R. Also, the maximum protruding amount PAa of the center land portion section 23Aa is not less than 1.0% and not more than 2.5% of the tire width direction dimension WLAa of the center land portion section 23Aa (the dimension between the edges of the center land portion section 23Aa). Also, the maximum protruding amount PAb of the center land portion section 23Ab is not less than 1.0% and not more than 2.5% of the tire width direction dimension WLAb of the center land portion section 23Ab (the dimension between the edges of the center land portion section 23Ab). In addition, the maximum protruding amount PAa, PAb of the land portion sections 23Aa, 23Ab is greater than the maximum protruding amount PB of the intermediate land portion 23B.

In this way, in the pneumatic tire 1 according to this embodiment, the tire width direction dimension WLA of the center land portion 23A is not less than 40 mm, and a sub groove 25 extending in the tire circumferential direction is provided. The sub groove 25 is disposed such that a center in the tire width direction is within 20% of the tire width direction dimension WLA of the center land portion 23A from the position of the center in the tire width direction of the center land portion 23A toward both sides in the tire width direction. The center land portion 23A is bisected in the tire width direction by the sub groove 25, and two center land portion sections 23Aa, 23Ab are partitioned and formed. The maximum protruding amounts PAa, PAb of the contact patches of the center land portion sections 23Aa, 23Ab are each not less than 1.0% and not more than 2.5% of the respective tire width direction dimensions WLAa, WLAb of the land portion sections 23Aa, 23Ab. The maximum protruding amounts PAa, PAb of the center land portion sections 23Aa, 23Ab are greater than the maximum protruding amount PB of the intermediate land portion 23B.

According to the pneumatic tire 1, when the tire width direction dimension WLA of the center land portion 23A is not less than 40 mm, the sub groove 25 is added to bisect the center land portion 23A into the two center land portion sections 23Aa, 23Ab. By setting the maximum protruding amounts PAa, PAb of the center land portion sections 23Aa, 23Ab to the above ranges, the footprint properties in the tire circumferential direction and the tire width direction of the center land portion 23A are improved. Therefore, it is possible to improve the steering stability on dry road surfaces.

Also, in the pneumatic tire 1 according to this embodiment, preferably, the groove area ratio of the grooves provided in the contact patch of the center land portion 23A is not less than 4% and not more than 10%, and the groove area ratio of the grooves provided in the contact patch of the intermediate land portion 23B is not less than 5% and not more than 15%. Note that "groove" refers to the lug grooves 24 and the sub grooves 25 in this embodiment.

By making the groove area ratio of the center land portion 23A not less than 4% and the groove area ratio of the intermediate land portion 23B not less than 5%, the rubber volume is reduced, the shrinkage of the tread rubber during vulcanization is excellent, and the footprint properties are further improved. On the other hand, by making the groove area ratio of the center land portion 23A not more than 10% and the groove area ratio of the intermediate land portion 23B not more than 15%, the reduction in rigidity of the land portion is suppressed, and the steering stability on dry road surfaces is further improved. Therefore, according to the pneumatic tire 1, it is possible to improve the footprint properties, and obtain a significant effect of improvement in steering stability on dry road surfaces.

In pneumatic tires 1 in which the orientation with respect to the inside and the outside of the vehicle is designated, preferably, the groove area ratio of the intermediate land portion 23B on the vehicle outer side is set to be less than the groove area ratio of the intermediate land portion 23B on the vehicle inner side, so the rigidity is increased on the vehicle outer side, and the steering stability when cornering is improved.

Also, as illustrated in FIG. 5, if the contact patches of the center land portion section 23Aa and the center land portion section 23Ab demarcated by the sub groove 25 form a single continuous protrusion, preferably, the maximum protrusion position P on the contact patch of the center land portion 23A, which is the combination of the center land portion section 23Aa and the center land portion section 23Ab, is disposed in a range SA within 10% of the tire width direction dimension WLA of the center land portion 23A from the center CA in the tire width direction of the center land portion 23A toward both sides in the tire width direction. Also, preferably, the maximum protrusion position P of the contact patch of the intermediate land portion 23B is disposed in a range SB not less than 53% and not more than 75% of the tire width direction dimension WLB of the intermediate land portion 23B from the edge of the intermediate land portion 23B on the inner side in the tire width direction outward in the tire width direction.

In the center land portion 23A, the footprint length in the tire circumferential direction tends to be shortest near the center CA in the tire width direction, and in the intermediate land portion 23B, the footprint length in the tire circumferential direction tends to be shortest outward in the tire width direction from the center in the tire width direction. Therefore, by prescribing the above ranges for the maximum protrusion position P of the contact patches in the land portions 23A, 23B, the footprint properties are improved, and it is possible to obtain a significant effect of improvement in the steering stability on dry road surfaces. More preferably, the maximum protrusion position P of the contact patch of the center land portion 23A is disposed at the center CA in the tire width direction of the center land portion 23A, in other words, the center of the tire width direction dimension WLA of the center land portion 23A. This is a position 0% of the tire width direction dimension WLA toward both sides in the tire width direction from the center CA in the tire width direction of the center land portion 23A. In this way, the footprint properties are improved, and it is possible to obtain a significant effect of improving the steering stability on dry road surfaces.

Also, as illustrated in FIG. 6, if the contact patches of the center land portion section 23Aa and the center land portion section 23Ab are each formed with their own protrusions, preferably, the maximum protrusion positions P of the contact patches of the center land portion sections 23Aa, 23Ab are disposed in ranges SAa, SAb within 10% of the tire width direction dimensions WLAa, WLAb of the center land portion sections 23Aa, 23Ab from the centers CAa, CAb in the tire width direction of the center land portion sections 23Aa, 23Ab toward both sides in the tire width direction. Also, preferably, the maximum protrusion position P of the contact patch of the intermediate land portion 23B is disposed in a range SB not less than 53% and not more than 75% of the tire width direction dimension WLB of the intermediate land portion 23B from the edge of the intermediate land portion 23B on the inner side in the tire width direction toward the outer side in the tire width direction.

In the center land portion sections 23Aa, 23Ab, the footprint length in the tire circumferential direction tends to be shortest near the centers CAa, CAb in the tire width direction, and in the intermediate land portion 23B, the footprint length in the tire circumferential direction tends to be shortest outward in the tire width direction from the center in the tire width direction. Therefore, by prescribing the above ranges for the maximum protrusion position P of the contact patches in the land portions 23Aa, 23Ab, 23B, the footprint properties are improved, and it is possible to obtain a significant effect of improvement in the steering stability on dry road surfaces. More preferably, the maximum protrusion positions P of the contact patches of the center land portion sections 23Aa, 23Ab are positioned in the centers CAa, CAb in the tire width direction of the center land portion sections 23Aa, 23Ab, in other words, the center of the tire width direction dimensions WLAa, WLAb of the center land portion sections 23Aa, 23Ab. This is a position 0% of the tire width direction dimensions WLAa, WLAb in the center land portion sections 23Aa, 23Ab toward both sides in the tire width direction from the centers CAa, CAb in the tire width direction of the center land portion sections 23Aa, 23Ab. In this way, the footprint properties are improved, and it is possible to obtain a significant effect of improving the steering stability on dry road surfaces.

EXAMPLES

In the working examples, performance tests for steering stability on dry road surfaces were performed on a plurality of types of pneumatic tires under different conditions (see FIGS. 7 to 12).

In the performance tests, pneumatic tires having a tire size of 275/35R20 were assembled on a regular rim (20×9J) and inflated to the regular inner pressure (250 kPa). Then, the pneumatic tire was mounted on a test vehicle having an engine displacement of 3,500 cc.

The method of evaluating the steering stability on the dry road surfaces was to drive the test vehicle on a dry test course, and sensory evaluation was carried out by one experienced test driver for the steering properties when changing lanes and when cornering, and the stability when moving forward. This sensory evaluation was expressed as an index with a conventional example of pneumatic tire as the standard (100), so that a higher index indicated excellent steering stability.

In FIGS. 7 to 12, the pneumatic tires according to Conventional Examples 1 and 2, Comparative Examples 1 to 4, and Working Examples 1 to 27 have two center side main grooves located near the tire equator line, disposed such that the centers in the tire width direction are located at positions offset from the tire equator line outward in the tire width direction not less than 10% and not more than 18% of the ground contact width. The two shoulder side main grooves that are located outward in the tire width direction are disposed such that the centers in the tire width direction are located at positions offset from the tire equator line outward in the tire width direction not less than 25% and not more than 35% of the ground contact width.

The pneumatic tires in FIGS. 7-8 do not have sub grooves. In FIGS. 7-8, in the pneumatic tire according to Conventional Example 1 the contact patches of the center land portion and the intermediate land portions do not protrude outward in the tire radial direction. Also, in the pneumatic tire according to Comparative Example 1, the contact patches of the center land portion and the intermediate land portions protrude outward in the tire radial direction, but the protruding amount is less than prescribed amounts. Also, in the pneumatic tire according to Comparative Example 2, the contact patches of the center land portion and the intermediate land portions protrude outward in the tire radial direction, but the protruding amount is the same in the center land portion and the intermediate land portions.

On the other hand, in FIGS. 7-8, in the pneumatic tires according to Working Examples 1 to 9, the contact patches of the center land portion and the intermediate land portions protrude outward in the tire radial direction, and the protruding amount is within the prescribed amounts, and moreover, the protruding amount of the center land portion is greater than that of the intermediate land portions. Also, in the pneumatic tires according to Working Examples 4 to 9, the groove area ratios of the center land portion and the intermediate land portions are within the prescribed ranges. Also, in the pneumatic tires according to Working Examples 6 to 9, the maximum protrusion positions of the center land portion and the intermediate land portions are within the prescribed ranges.

The pneumatic tires in FIGS. 9-10 have sub grooves. In FIGS. 9-10, in the pneumatic tire according to Conventional Example 2, the contact patches of the center land portion and the intermediate land portions do not protrude outward in the tire radial direction. In the pneumatic tires according to Comparative Example 3 and Comparative Example 4, the form of the center land portion section is the form illustrated in FIG. 5. Also, in the pneumatic tire according to Comparative Example 3, the contact patches of the center land portion sections (center land portion) and the intermediate land portions protrude outward in the tire radial direction, but the protruding amount is less than prescribed amounts.

Also, in the pneumatic tire according to Comparative Example 4, the contact patches of the center land portion sections (center land portion) and the intermediate land portions protrude outward in the tire radial direction, but the protruding amount is the same in the center land portion sections (center land portion) and the intermediate land portions.

On the other hand, in FIGS. 9-10, in the pneumatic tires according to Working Examples 10 to 18, the form of the center land portion section is the form illustrated in FIG. 5. Also, in the pneumatic tires according to Working Examples 10 to 18, the contact patches of the center land portion sections (center land portion) and the intermediate land portions protrude outward in the tire radial direction, and the protruding amount is within the prescribed amounts, and moreover, the protruding amount of the center land portion sections (center land portion) is greater than that of the intermediate land portions. Also, in the pneumatic tires according to Working Examples 13 to 18, the groove area ratios of the center land portion sections (center land portion) and the intermediate land portions are within the prescribed ranges. Also, in the pneumatic tires according to Working Examples 15 to 18, the maximum protrusion positions of the center land portion sections (center land portion) and the intermediate land portions are within the prescribed ranges.

The pneumatic tires in FIGS. 11-12 have sub grooves. In FIGS. 11-12, in the pneumatic tire according to Conventional Example 2, the contact patches of the center land portion and the intermediate land portions do not protrude outward in the tire radial direction. In the pneumatic tires according to Comparative Example 5 and Comparative Example 6, the form of the center land portion section is the form illustrated in FIG. 6. Also, in the pneumatic tire according to Comparative Example 5, the contact patches of the center land portion sections (center land portion) and the intermediate land portions protrude outward in the tire radial direction, but the protruding amount is less than prescribed amounts. Also, in the pneumatic tire according to Comparative Example 6, the contact patches of the center land portion sections (center land portion) and the intermediate land portions protrude outward in the tire radial direction, but the protruding amount is the same in the center land portion sections (center land portion) and the intermediate land portions.

On the other hand, in FIGS. 11-12, in the pneumatic tires according to Working Examples 19 to 27, the form of the center land portion section is the form illustrated in FIG. 6. Also, in the pneumatic tires according to Working Examples 19 to 27, the contact patches of the center land portion sections (center land portion) and the intermediate land portions protrude outward in the tire radial direction, and the protruding amount is within the prescribed amounts, and moreover, the protruding amount of the center land portion sections (center land portion) is greater than that of the intermediate land portions. Also, in the pneumatic tires according to Working Examples 22 to 27, the groove area ratios of the center land portion sections (center land portion) and the intermediate land portions are within the prescribed ranges. Also, in the pneumatic tires according to Working Examples 24 to 27, the positions of the maximum protrusion of the center land portion sections (center land portion) and the intermediate land portions are within the prescribed ranges.

From the test results shown in FIGS. 7 to 12, it can be seen that the pneumatic tires according to Working Examples 1 to 27 have improved steering stability.

What is claimed is:

1. A pneumatic tire, comprising:

two center side linear main grooves extending in a tire circumferential direction, one of the two center side linear main grooves being provided on one side of a tire equator line in a tire width direction and another one of the two center side linear main grooves being provided on an other side of the tire equator line in the tire width direction;

two shoulder side linear main grooves extending in the tire circumferential direction, one of the two shoulder side linear main grooves being provided on the one side of the tire equator line in the tire width direction and another one of the two shoulder side linear main grooves being provided on the other side of the tire equator line in the tire width direction; and five land portions extending in the tire circumferential direction partitioned by the linear main grooves, on a tread surface of a tread portion, wherein the two center side linear main grooves located close to the tire equator line are disposed such that centers in the tire width direction are located at positions offset from the tire equator line outward in the tire width direction not less than 10% and not more than 18% of a ground contact width; the two shoulder side linear main grooves located outward in the tire width direction are disposed such that centers in the tire width direction are located at positions offset from the tire equator line outward in the tire width direction not less than 25% and not more than 35% of the ground contact width, a contact patch of a center land portion partitioned by the center side linear main grooves protrudes outward in a tire radial direction from an overall standard profile line of the tread portion, and a maximum protruding amount thereof is in not less than 1.0% and not more than 2.4% of the tire width direction dimension of the center land portion, a contact patch of an intermediate land portion partitioned by the center side linear main groove and the shoulder side linear main groove protrudes outward in the tire radial direction from the standard profile line, and a maximum protruding amount thereof is not less than 0.7% and not more than 2.0% of the tire width direction dimension of the intermediate land portion, the maximum protruding amount of the center land portion is greater than the maximum protruding amount of the intermediate land portion, and the tire width direction dimension of the center land portion is not less than 40 mm, a sub groove is provided extending in the tire circumferential direction, the sub groove is disposed such that a center in the tire width direction is within 20% of the tire width direction dimension of the center land portion from the position of the center in the tire width direction of the center land portion toward both sides in the tire width direction, the center land portion is bisected in the tire width direction by the sub groove so as to partition and form two center land portion sections, and maximum protruding amounts of contact patches of the center land portion sections are each not less than 1.0% and not more than 2.4% of the respective tire width direction dimension of the center land portion section.

2. The pneumatic tire according to claim 1, wherein each of the center and intermediate land portions comprises a continuous rib extending in the tire circumferential direction.

3. The pneumatic tire according to claim 1, wherein a groove area ratio of the grooves provided in the contact patch of the center land portion is not less than 4% and not more than 10%, and a groove area ratio of the grooves provided in the contact patch of the intermediate land portion is not less than 5% and not more than 15%.

4. The pneumatic tire according to claim 3, wherein a maximum protrusion position of the contact patch of each of the center land portion sections is disposed within 10% of the tire width direction dimension of the respective center land portion section toward both sides in the tire width direction from the center in the tire width direction of the center land portion section, and the maximum protrusion position of the contact patch of the intermediate land portion is disposed not less than 53% and not more than 75% of the tire width direction dimension of the intermediate land portion from an edge of the intermediate land portion on an inner side in the tire width direction outward in the tire width direction.

5. The pneumatic tire according to claim 1, wherein, a maximum protrusion position of the contact patch of the center land portion is disposed within 10% of the tire width direction dimension of the center land portion toward both sides in the tire width direction from the center in the tire width direction of the center land portion, and a maximum protrusion position of the contact patch of the intermediate land portion is disposed not less than 53% and not more than 75% of the tire width direction dimension of the intermediate land portion from an edge of the intermediate land portion on an inner side in the tire width direction outward in the tire width direction.

6. A pneumatic tire, comprising:

two center side linear main grooves extending in a tire circumferential direction, one of the two center side linear main grooves being provided on one side of a tire equator line in a tire width direction and another one of the two center side linear main grooves being provided on an other side of the tire equator line in the tire width direction;

two shoulder side linear main grooves extending in the tire circumferential direction, one of the two shoulder side linear main grooves being provided on the one side of the tire equator line in the tire width direction and another one of the two shoulder side linear main grooves being provided on the other side of the tire equator line in the tire width direction; and five land portions extending in the tire circumferential direction partitioned by the linear main grooves, on a tread surface of a tread portion, wherein the two center side linear main grooves located close to the tire equator line are disposed such that centers in the tire width direction are located at positions offset from the tire equator line outward in the tire width direction not less than 10% and not more than 18% of a ground contact width; the two shoulder side linear main grooves located outward in the tire width direction are disposed such that centers in the tire width direction are located at positions offset from the tire equator line outward in the tire width direction not less than 25% and not more than 35% of the ground contact width, a contact patch of a center land portion partitioned by the center side linear main grooves protrudes outward in a tire radial direction from an overall standard profile line of the tread portion, and a maximum protruding amount thereof is in not less than 1.0% and not more than 2.4% of the tire width direction dimension of the center land portion, a contact patch of an intermediate land portion partitioned by the center side linear main groove and the shoulder side linear main groove protrudes outward in the tire radial direction from the standard profile line, and a maximum protruding amount thereof is not less than 0.7% and not more than 2.0% of the tire width direction dimension of the intermediate land portion, the maximum protruding amount of the center land portion is greater than the maximum protruding amount of the intermediate land portion, the tire width direction dimension of the center land portion is not less than 40 mm, a sub groove is provided extending in the tire circumferential direction, the sub groove is disposed such that a center in the tire width direction is within 20% of the tire width direction dimension of the center land portion from the position of the center in the tire width direction of the center land portion toward both sides in the tire width direction, the center land portion is bisected in the tire width direction by the sub groove so as to partition and form two center land portion sections, the maximum protruding amounts of the contact patches of the center land portion sections are each not less than 1.0% and not more than 2.4% of the respective tire width direction dimension of the center land portion section, a maximum protrusion position of the contact patch of each of the center land portion sections is disposed within 10% of the tire width direction dimension of the respective center land portion section toward both sides in the tire width direction from the center in the tire width direction of the center land portion section, and the maximum protrusion position of the contact patch of the intermediate land portion is disposed not less than 53% and not more than 75% of the tire width direction dimension of the intermediate land portion from an edge of the intermediate land portion on an inner side in the tire width direction outward in the tire width direction.

7. The pneumatic tire according to claim 1, wherein a width of the center land portion is greater than a width of the intermediate land portion.

8. The pneumatic tire according to claim 1, wherein the maximum protruding amount of the contact patch of the center land portion is not less than 1.0% and not more than 2.0% of the tire width direction dimension of the center land portion.

9. The pneumatic tire according to claim 1, wherein the two shoulder side linear main grooves located outward in the tire width direction are disposed such that centers in the tire width direction are located at positions offset from the tire equator line outward in the tire width direction not less than 25% and not more than 30% of the ground contact width.

\* \* \* \* \*